US012266882B2

(12) United States Patent
Ono et al.

(10) Patent No.: US 12,266,882 B2
(45) Date of Patent: Apr. 1, 2025

(54) CONNECTOR INCLUDING TERMINAL FITTING EMBEDDED IN HOUSING AND MANUFACTURING METHOD OF CONNECTOR INCLUDING TERMINAL FITTING EMBEDDED IN HOUSING

(71) Applicant: YAZAKI CORPORATION, Tokyo (JP)

(72) Inventors: Hiroaki Ono, Makinohara (JP); Toru Suzuki, Makinohara (JP); Noboru Hayasaka, Makinohara (JP); Kazuya Takeda, Makinohara (JP); Tatsuya Hosono, Makinohara (JP); Jun Sugioka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 387 days.

(21) Appl. No.: 17/945,289

(22) Filed: Sep. 15, 2022

(65) Prior Publication Data

US 2023/0084744 A1 Mar. 16, 2023

(30) Foreign Application Priority Data

Sep. 16, 2021 (JP) ................................. 2021-151567

(51) Int. Cl.

| | |
|---|---|
| ***H01R 13/504*** | (2006.01) |
| ***H01R 13/405*** | (2006.01) |
| ***H01R 13/52*** | (2006.01) |
| ***H01R 13/533*** | (2006.01) |

(52) U.S. Cl.

CPC ......... *H01R 13/504* (2013.01); *H01R 13/405* (2013.01); *H01R 13/5205* (2013.01); *H01R 13/533* (2013.01)

(58) Field of Classification Search

CPC .. H01R 13/405; H01R 13/502; H01R 13/504; H01R 13/5205; H01R 13/5216; H01R 13/5219; H01R 2201/26

See application file for complete search history.

(56) References Cited

U.S. PATENT DOCUMENTS

| | | | | |
|---|---|---|---|---|
| 5,926,952 | A | 7/1999 | Ito | |
| 10,707,609 | B2 * | 7/2020 | Inoue | H01R 27/02 |
| 2009/0258521 | A1 * | 10/2009 | Ooki | H01R 13/521 439/275 |
| 2015/0118905 | A1 | 4/2015 | Mori et al. | |
| 2017/0194735 | A1 * | 7/2017 | Arai | H01R 13/6587 |
| 2020/0303868 | A1 * | 9/2020 | Tezuka | H01R 13/50 |
| 2021/0119375 | A1 * | 4/2021 | Kellogg | H01R 13/502 |
| 2021/0226378 | A1 * | 7/2021 | Sato | H01R 13/04 |

FOREIGN PATENT DOCUMENTS

| | | |
|---|---|---|
| JP | 7-114970 A | 5/1995 |
| JP | 2014-17197 A | 1/2014 |

* cited by examiner

*Primary Examiner* — Oscar C Jimenez
(74) *Attorney, Agent, or Firm* — Sughrue Mion, PLLC

(57) ABSTRACT

The present disclosure relates to a connector and a manufacturing method or a connector. The connector includes: a terminal fitting; and a housing holding the terminal fitting. The housing includes a first resin molded body in which at least a part of the terminal fitting is embedded, the first resin molded body being made of a first material, and a second resin molded body in which at least a part of the first resin molded body is embedded, the second resin molded body being made of a second material. The first material has a linear thermal expansion coefficient smaller than that of the second material.

4 Claims, 6 Drawing Sheets

CONNECTOR INCLUDING TERMINAL FITTING EMBEDDED IN HOUSING AND MANUFACTURING METHOD OF CONNECTOR INCLUDING TERMINAL FITTING EMBEDDED IN HOUSING

CROSS-REFERENCE TO RELATED APPLICATIONS

This application is based on and claims priority under 35 USC 119 from Japanese Patent Application No. 2021-151567 filed on Sep. 16, 2021, the contents of which are incorporated herein by reference.

TECHNICAL FIELD

The present disclosure relates to a connector in which a terminal fitting is held in a housing and a manufacturing method of a connector.

BACKGROUND ART

In the related art, a connector configured such that a terminal fitting is embedded in a resin housing has been proposed, for example, in JP2014-017197A. This type of connector is manufactured, for example, by insert molding a terminal fitting into a housing.

When the connector as described above is used, during energization of the terminal fitting, the temperature of the terminal fitting and the housing around the terminal fitting rises due to Joule heat caused by the energization. On the contrary, when the terminal fitting is not energized, such an increase in temperature does not occur. In other words, by repeatedly switching between the energization and the non-energization of the terminal fitting, the temperature of the terminal fitting and the housing repeatedly fluctuates up and down. Here, in general, a metal material constituting the terminal fitting and a resin material constituting the housing have different thermal expansion coefficients (for example, linear thermal expansion coefficients), and therefore, rates of expansion and contraction associated with the temperature fluctuation are also different. For example, in a normal environment in which the connector is used, a linear thermal expansion coefficient of copper is about $17.7\times10^{-6}/°$ C., and a linear thermal expansion coefficient of polypropylene is about $110.0\times10^{-6}/°$ C. Due to such a difference in linear thermal expansion coefficient, when the above-described temperature fluctuation is repeated, damage such as a crack may occur in the housing with a housing portion or the like adjacent to a sharp portion such as a corner portion or the like of the terminal fitting as a starting point.

On the other hand, in order to prevent such damage of the housing (that is, to improve so-called heat shock resistance), it is conceivable to configure the housing by using a resin material having a small difference in linear thermal expansion coefficient from the metal material constituting the terminal fitting. However, the resin material having such heat characteristics is generally expensive, and therefore, there is a concern that the manufacturing cost of the connector is increased.

SUMMARY OF INVENTION

The present disclosure provides a connector with improved heat shock resistance while an increase in the manufacturing cost is reduced, and a manufacturing method of a connector.

A connector includes: a terminal fitting; and a housing holding the terminal fitting. The housing includes a first resin molded body in which at least a part of the terminal fitting is embedded, the first resin molded body being made of a first material, and a second resin molded body in which at least a part of the first resin molded body is embedded, the second resin molded body being made of a second material. The first material has a linear thermal expansion coefficient smaller than that of the second material.

A manufacturing method of a connector in which a terminal fitting is held by a housing, the manufacturing method includes: molding a first resin molded body, being made of a first material, in which at least a part of the terminal fitting is embedded such that the first resin molded body has a shape of a part of the housing; and molding a second resin molded body, being made of a second material, in which at least a part of the first resin molded body is embedded such that the second resin molded body has a shape of another part of the housing. The first material has a linear thermal expansion coefficient smaller than that of the second material.

The present disclosure has been briefly described above. Details of the present disclosure will be further clarified by reading a mode for carrying out the disclosure to be described below (hereinafter, referred to as "embodiment") with reference to the accompanying drawings.

DESCRIPTION OF EMBODIMENTS

Figure 1:
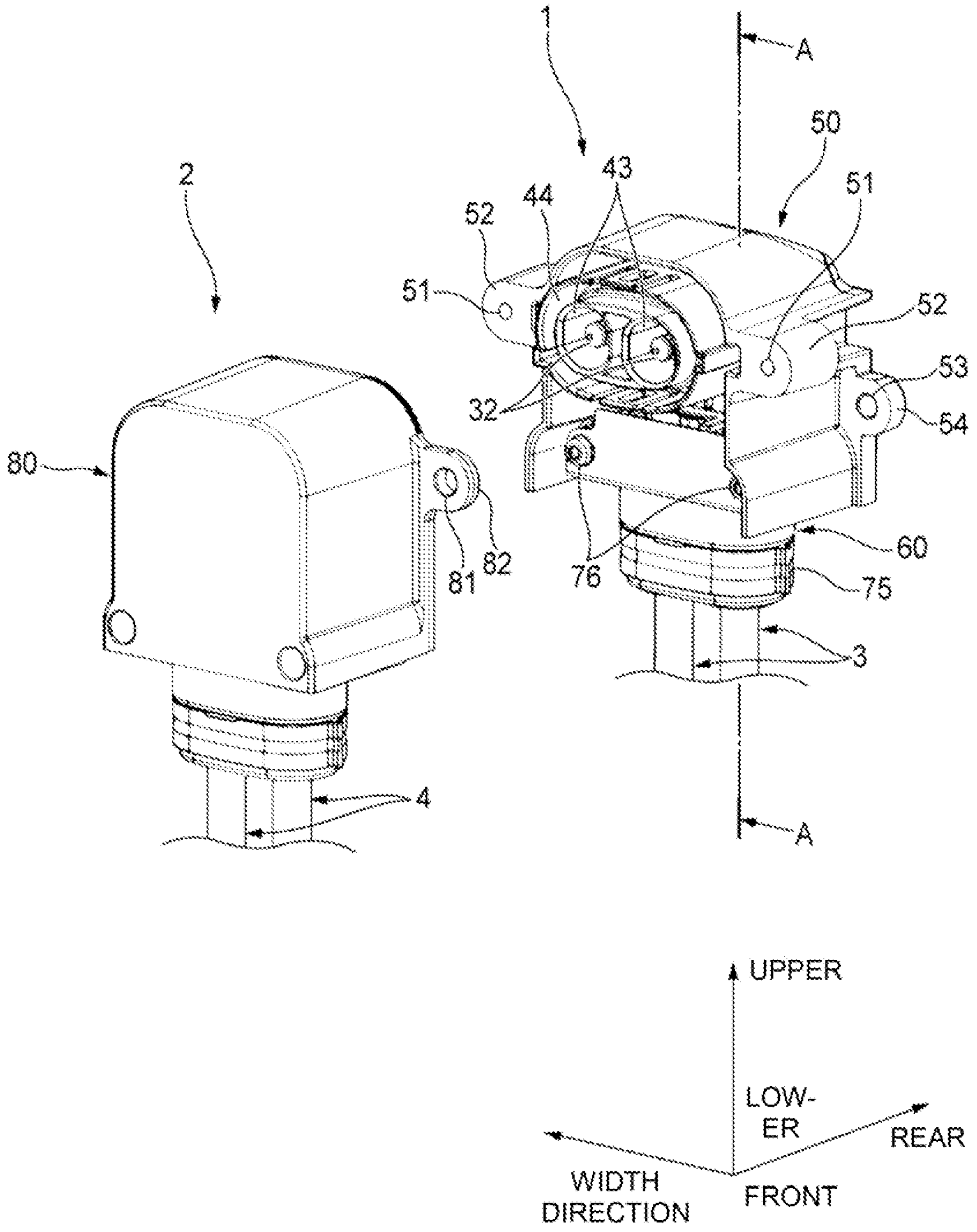
FIG. 1 is a perspective view showing a connector and a counterpart connector according to an embodiment of the present disclosure.

Hereinafter, a connector 1 according to an embodiment of the present disclosure will be described with reference to the drawings. As shown in FIG. 1, a connector 1 can be fitted to a counterpart connector 2. The connector 1 and the counterpart connector 2 are typically connectors used in a power supply circuit such as an inverter or a motor to be mounted on a vehicle such as a hybrid vehicle or an electric vehicle.

As shown in FIG. 1, the connector 1 is connected to end portions of a pair of electric wires 3 which are electric power lines, and the counterpart connector 2 is connected to end portions of a pair of electric wires 4 which are electric power lines. By fitting the connector 1 and the counterpart connector 2 to each other, the electrical wires 3 and 4 are electrically connected to each other.

Hereinafter, for convenience of description, as shown in FIGS. 1 to 7, a "front-rear direction", a "upper-lower direction", and a "width direction" are defined. The "front-rear direction", the "upper-lower direction", and the "width direction" are orthogonal to each other. The front-rear direction coincides with a fitting direction of the connector 1 and the counterpart connector 2. An advancing side and a retreating side of the fitting of the connector 1 with the counterpart connector 2 are respectively set as a front side and a rear side.

Figure 2:
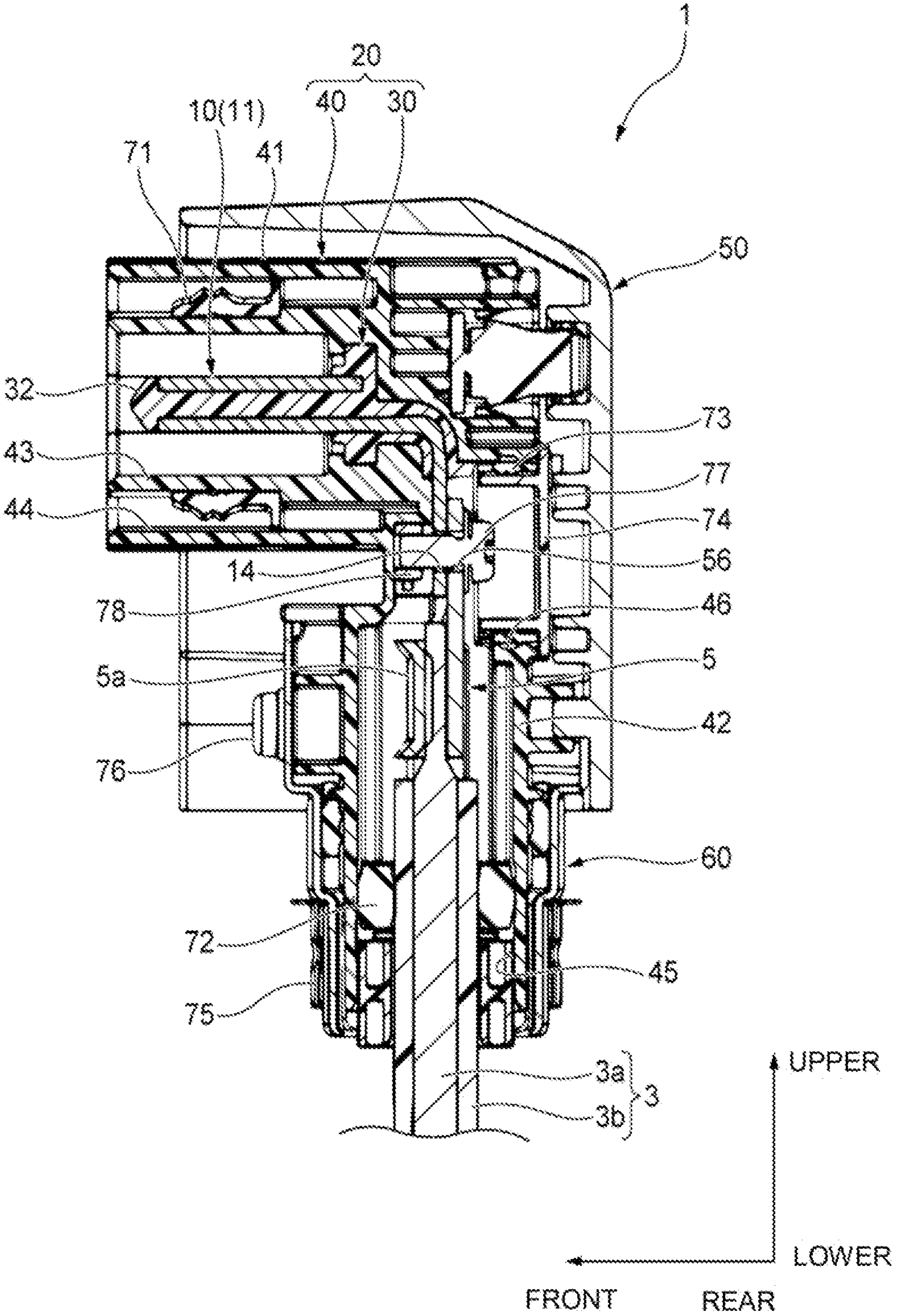
FIG. 2 is a cross-sectional view of the connector shown in FIG. 1 taken along a line A-A of FIG. 1.

As shown in FIG. 2, the connector 1 includes a terminal 10, a housing 20 holding the terminal 10, an upper shield shell 50 covering an upper portion of the housing 20, and a lower shield shell 60 covering a lower portion of the housing 20. Hereinafter, each component constituting the connector 1 will be described in order.

Figure 4:
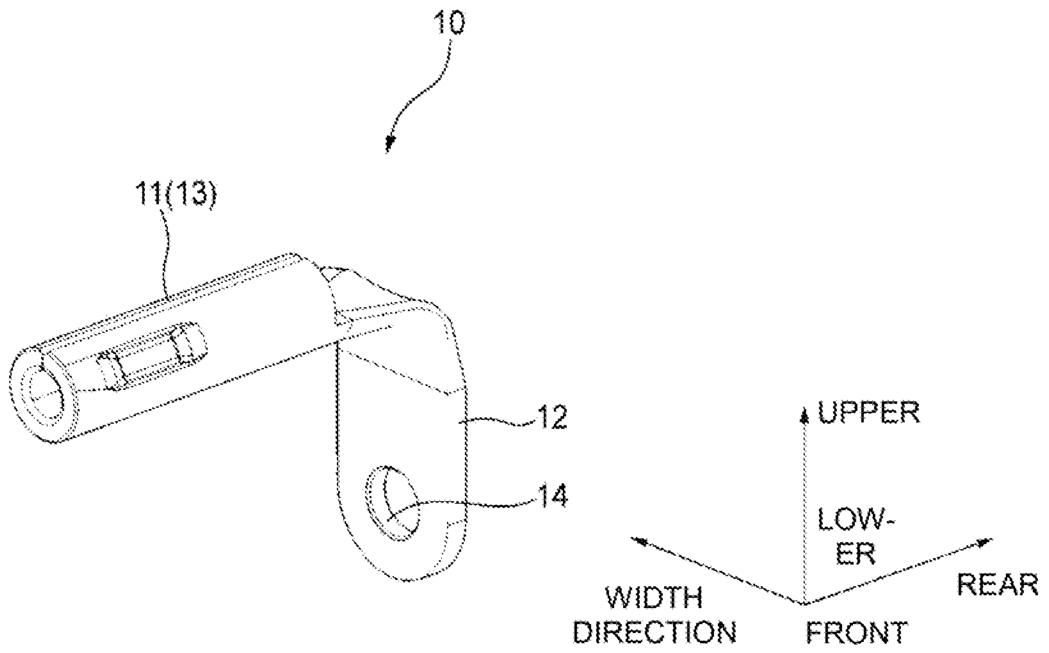
FIG. 4 is a perspective view of the terminal.

First, the terminal 10 will be described. The terminal 10 is formed by performing press working, bending, or the like on one metal plate. As shown in FIG. 4, the terminal 10 includes a connecting portion (male terminal portion) 11 extending in the front-rear direction and a hanging portion 12 extending toward a lower side from a rear end portion of the connecting portion 11, and has a substantially L shape when viewed from the width direction.

The connecting portion 11 is formed with a cylindrical contact portion 13 extending in the front-rear direction except for the rear end portion (a boundary portion with the hanging portion 12). The hanging portion 12 has a flat plate shape whose plate thickness direction is oriented in the front-rear direction, and a screw through hole 14 that penetrates in the front-rear direction is formed at a lower end portion of the hanging portion 12. The terminal 10 is made of copper or aluminum. A linear thermal expansion coefficient of copper is about $16.6\times10^{-6}/°$ C., and a linear thermal expansion coefficient of aluminum is about $23.0\times10^{-6}/°$ C. A value of the linear thermal expansion coefficient can be measured, for example, in accordance with a linear thermal expansion coefficient test method defined in Japanese Industrial Standards (JIS) K 7197.

Next, the housing 20 will be described. As shown in FIG. 2, the housing 20 includes a first resin molded body 30 which is a primary molded body and a second resin molded body 40 which is a secondary molded body. A linear thermal expansion coefficient of a material constituting the first resin molded body 30 is smaller than a linear thermal expansion coefficient of a material constituting the second resin molded body 40. Functions and effects thereof will be described later.

Figure 5:
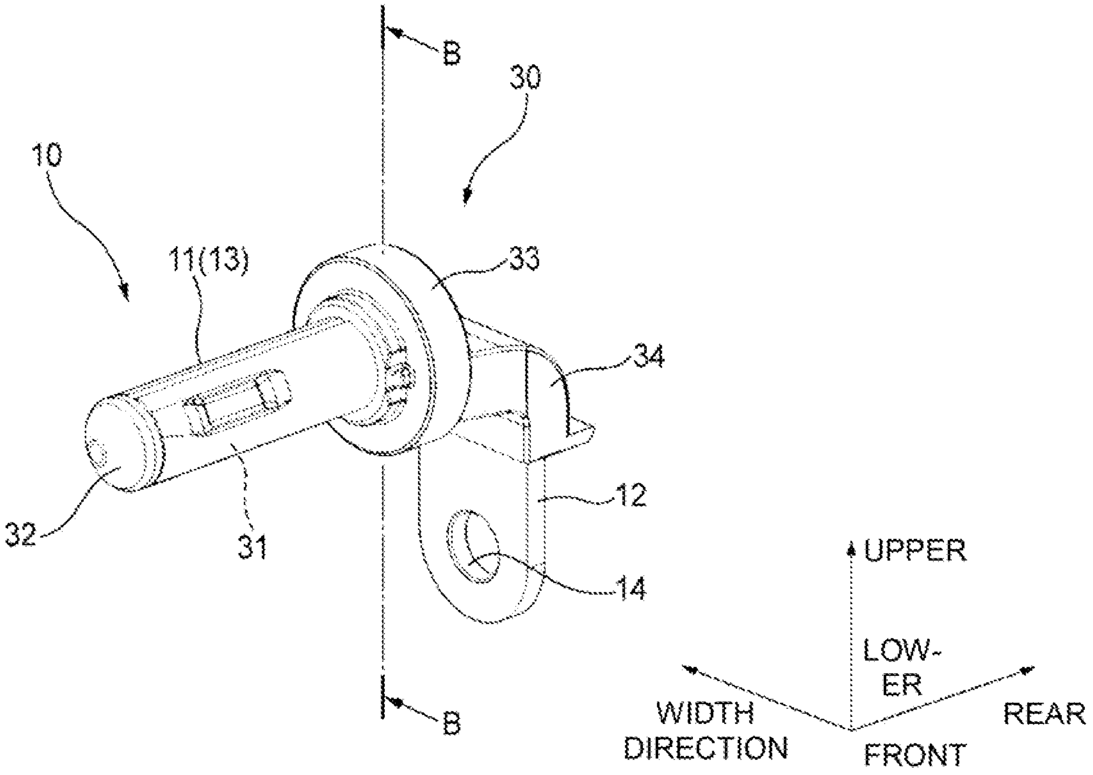
FIG. 5 is a perspective view showing a first resin molded body integrated with the terminal by primary molding using the terminal as an insert member.
Figure 6:
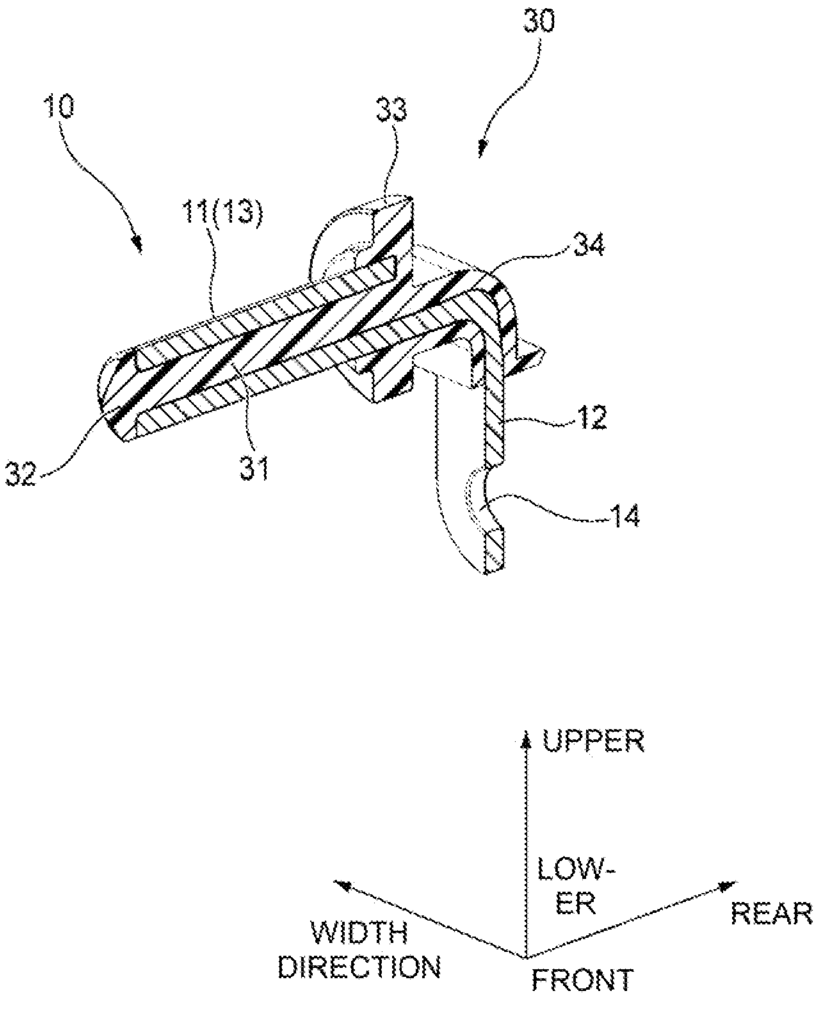
FIG. 6 is a cross-sectional view taken along a line B-B in FIG. 5.

First, the first resin molded body 30 will be described. As shown in FIGS. 5 and 6, the first resin molded body 30 is a primary molded body integrated with the terminal 10 by primary molding (insert molding) using the terminal 10 as an insert member. The first resin molded body 30 is made of a composition containing a polyethylene terephthalate resin and a glass fiber. The composition constituting the first resin molded body 30 may further contain an elastomer. A linear thermal expansion coefficient of the material constituting the first resin molded body 30 is larger than the linear thermal expansion coefficient of the metal material constituting the terminal 10, and is smaller than a linear thermal expansion coefficient of a material constituting the second resin molded body 40 (details will be described later).

As shown in FIGS. 5 and 6, the first resin molded body 30 integrally includes a shaft-shaped portion 31 filled in a hollow portion of the cylindrical contact portion 13 of the terminal 10, a front end portion 32 which is connected to a front end of the shaft-shaped portion 31 and covers a front end opening of the contact portion 13, a rear end portion 33 which is connected to a rear end of the shaft-shaped portion 31 and covers a rear end opening of the contact portion 13, and an extension portion 34 which is connected to a rear side of the rear end portion 33 and covers a portion near the boundary portion between the connecting portion 11 and the hanging portion 12. Most of an outer peripheral surface of the contact portion 13 of the terminal 10 excluding the rear end portion and most of an outer peripheral surface of the hanging portion 12 of the terminal 10 excluding an upper end portion are exposed to the outside without being covered with the first resin molded body 30. As described above, a part of the terminal 10 is embedded in the first resin molded body 30.

The front end portion 32 has a tapered shape protruding toward a front side. As a result, the front end portion 32 functions as a resin cap that has a finger touch prevention function of the terminal 10 and a function of picking up a counterpart terminal (not shown) in the counterpart connector 2 to be connected to the terminal 10 (function of improving insertion and removal resistance). The rear end portion 33 is an annular flange portion protruding radially outward of the contact portion 13 of the terminal 10.

Figure 7:
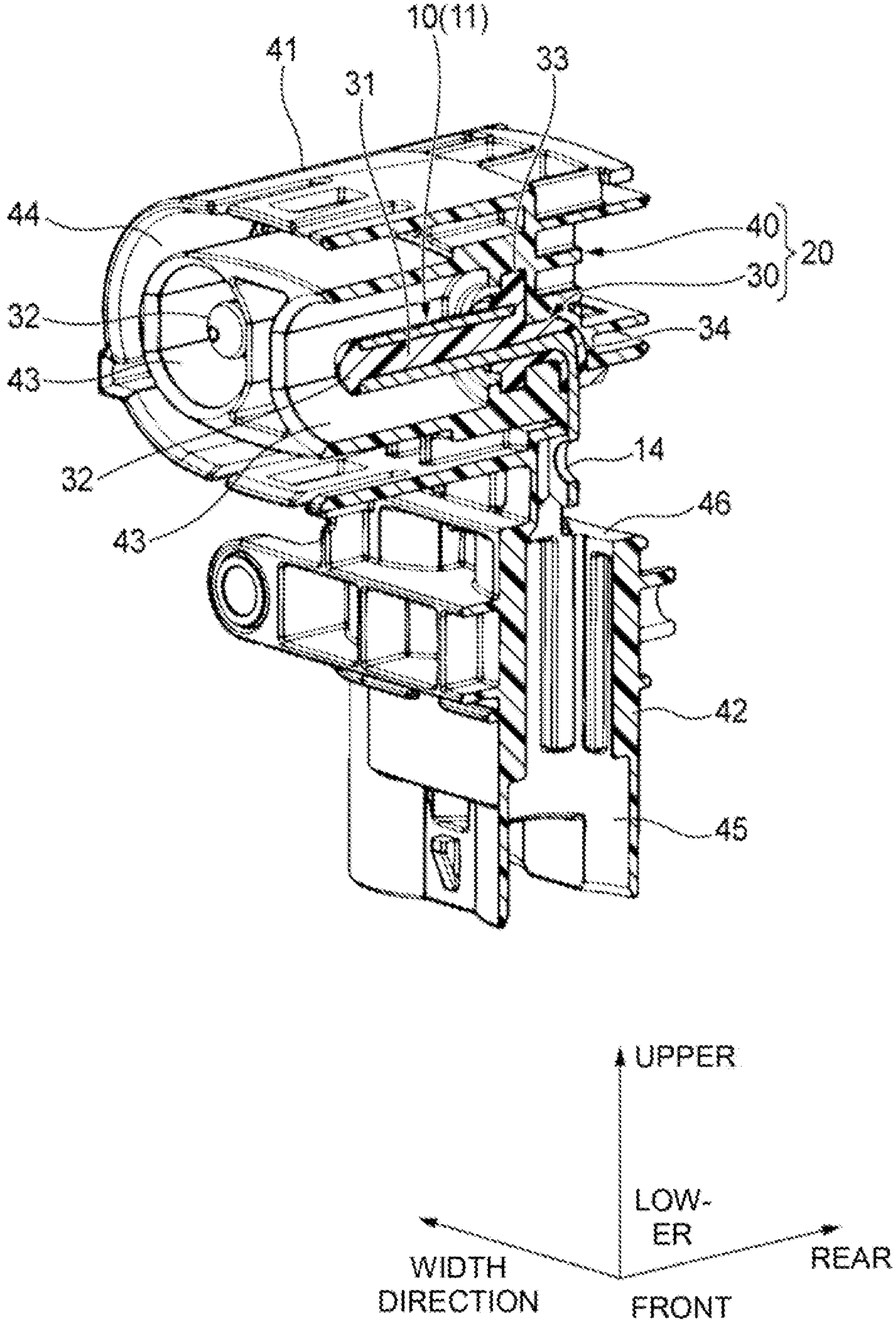
FIG. 7 is a perspective view showing a second resin molded body integrated with the first resin molded body by secondary molding using the first resin molded body integrated with the terminal as an insert member.

Next, the second resin molded body 40 will be described. As shown in FIG. 7, the second resin molded body 40 is a secondary molded body integrated with the first resin molded body 30 by secondary molding (insert molding) using the first resin molded body 30 integrated with the terminal 10 as an insert member.

Similar to the first resin molded body 30, the second resin molded body 40 is also made of a composition containing the polyethylene terephthalate resin and the glass fiber. By using the fact that the linear thermal expansion coefficient of the glass fiber is smaller than the linear thermal expansion coefficient of the polyethylene terephthalate resin or the like, a content rate of the glass fiber in the composition constituting the first resin molded body 30 is made larger than a content rate of the glass fiber in the composition constituting the second resin molded body 40, so that the linear thermal expansion coefficient of the material constituting the first resin molded body 30 is made smaller than the linear thermal expansion coefficient of the material constituting the second resin molded body 40. In the present embodiment, the content rate of the glass fiber in the composition constituting the first resin molded body 30 is 30% by weight, and the content rate of the glass fiber in the composition constituting the second resin molded body 40 is 15% by mass. In general, the glass fiber is more expensive than the polyethylene terephthalate resin.

Figure 3:
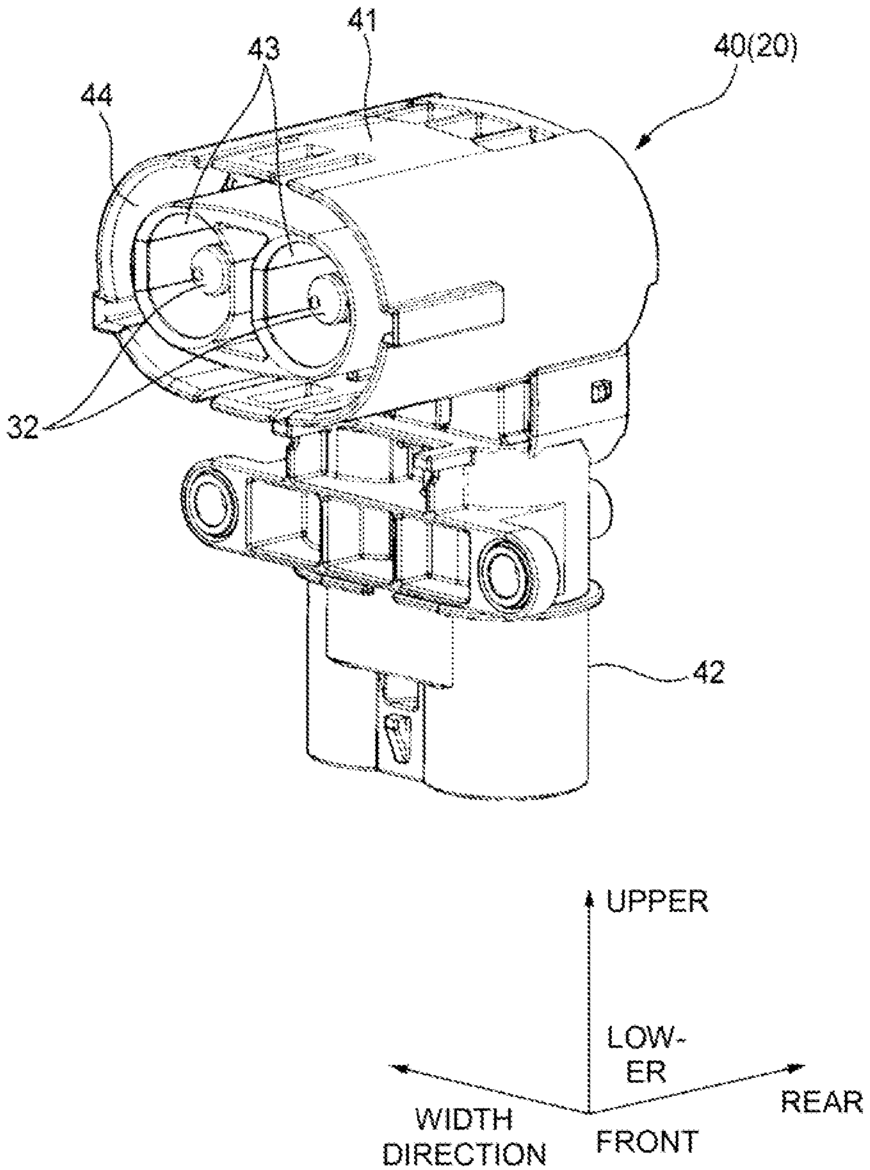
FIG. 3 is a perspective view showing a housing holding a terminal.

As shown in FIGS. 2, 3, and 7, the second resin molded body 40 includes a terminal holding portion 41 extending in the front-rear direction and an electric wire lead-out portion 42 extending toward the lower side from a rear end portion of the terminal holding portion 41, and has a substantially L shape when viewed from the width direction.

In the terminal holding portion 41, a pair of first resin molded bodies 30 integrated with the terminal 10 are integrated in a state of being arranged side by side in the width direction. As shown in FIGS. 2 and 7, the rear end portion 33 and the extension portion 34 of the first resin molded body 30 are embedded in the terminal holding portion 41, and the contact portion 13 of the terminal 10 is not embedded in the terminal holding portion 41 (exposed forward). Therefore, in the first resin molded body 30, the shaft-shaped portion 31 and the front end portion 32 positioned at the inside and a distal end portion of the contact portion 13 are also not embedded in the terminal holding portion 41. In this way, a part of the first resin molded body 30 is embedded in the terminal holding portion 41 of the second resin molded body 40.

In the terminal holding portion 41, a pair of terminal accommodating recessed portions 43 are formed so as to be arranged in the width direction corresponding to the contact portions 13 of the pair of terminals 10 arranged in the width direction. In an internal space of each terminal accommodating recessed portion 43, the contact portion 13 of the corresponding terminal 10 is coaxially positioned so as to be exposed forward. The terminal holding portion 41 is provided with an annular groove 44 having a long hole shape elongated in the width direction so as to surround the pair of terminal accommodating recessed portions 43. As shown in FIG. 2, an annular sealing member 71 is provided in the annular groove 44.

As shown in FIGS. 2 and 7, an electric wire through hole 45 penetrating in the upper-lower direction is formed in the electric wire lead-out portion 42. The hanging portions 12 of the pair of terminals 10 are positioned directly above an upper end opening of the electric wire through hole 45. An opening 46 is formed in a rear end surface of an upper end portion (a boundary portion between the terminal holding portion 41 and the electric wire lead-out portion 42) of the electric wire lead-out portion 42. By forming the opening 46, a pair of screw through holes 14 formed in the hanging portions 12 of the pair of terminals 10 are exposed rearward (see FIGS. 2 and 7).

As shown in FIG. 2, a pair of electric wires 3 having an annular sealing member 72 mounted on an outer periphery thereof are inserted into the electric wire through holes 45 from the lower side. The sealing member 72 seals between the pair of electric wires 3 and the electric wire through hole 45. The end portions of the electric wires 3 inserted into the electric wire through holes 45 are respectively connected to the hanging portions 12 of the corresponding terminals 10 via a connection terminal 5 made of metal.

More specifically, the electric wire 3 is a covered electric wire in which an outer periphery of a conductor core wire 3*a* is covered with an outer sheath 3*b*, and the conductor core wire 3*a* is exposed from the outer sheath 3*b* at the end portion of the electric wire 3. The exposed conductor core wire 3*a* of the electric wire 3 is crimped and fixed to the lower end portion of the connection terminal 5 by using a caulking piece 5*a* provided at a lower end portion of the connection terminal 5 extending in the upper-lower direction. A screw through hole 5*b* is provided in an upper end portion of the connection terminal 5. In a state where the screw through hole 5*b* of the connection terminal 5 and the screw through hole 14 of the terminal 10 are aligned, an upper end portion of the connection terminal 5 and the hanging portion 12 of the terminal 10 are fastened and fixed by using a screw 77 and a nut 78 inserted into the screw through hole 5*b* and the screw through hole 14 in this order.

As a result, the end portion of each electric wire 3 is connected to the hanging portion 12 of the corresponding terminal 10 via the connection terminal 5. After the connection between the pair of electric wires 3 and the pair of terminals 10 is completed in this manner, the opening 46 is closed by a lid member 74 to which a sealing member 73 is attached. The sealing member 73 seals between an inner wall of the opening 46 and the lid member 74.

Next, the upper shield shell 50 will be described. As shown in FIG. 1, the upper shield shell 50 made of metal has a shape capable of covering the upper portion of the housing 20 from above, side, and rear. The upper shield shell 50 is attached to the housing 20 (the second resin molded body 40) from the rear so as to cover the upper portion of the housing 20 from above, side, and rear.

The upper shield shell 50 is formed with a pair of flange portions 52 in which bolt holes 51 are respectively formed. The pair of bolt holes 51 are used when the connector 1 and the counterpart connector 2 are fitted to each other. Further, the upper shield shell 50 is formed with a fixing piece 54 in which a hole portion 53 is formed. The connector 1 is fixed to the device by screwing a bolt (not shown) inserted into the hole portion 53 of the fixing piece 54 of the upper shield shell 50 into a bolt hole of a device such as an inverter or a motor.

Next, the lower shield shell 60 will be described. As shown in FIG. 1, the lower shield shell 60 made of metal has a shape that can cover a lower portion of the housing 20 (more specifically, the electric wire lead-out portion 42). The lower shield shell 60 is mounted on the housing 20 (the second resin molded body 40) from below so as to cover the lower portion of the housing 20.

The upper shield shell 50 and the lower shield shell 60 are fastened and electrically connected to each other by the screw 76 (see FIGS. 1 and 2) in a state of being mounted on the housing 20. A conductive braid (not shown) covering an electric wire bundle in which a pair of electric wires 3 are bundled by a shield ring 75 (see FIGS. 1 and 2) is fixed and electrically connected to the lower shield shell 60. The components constituting the connector 1 have been described above.

The connector 1 having the above configuration is fitted to the counterpart connector 2 (see FIG. 1) to which the pair of electric wires 4 are connected. In a fitted state of the connector 1 and the counterpart connector 2, a pair of terminal accommodating portions (not shown) of the counterpart connector 2 are inserted and fitted into the pair of terminal accommodating recessed portions 43 (see FIG. 1) of the connector 1, respectively. Therefore, a pair of counterpart terminals (female terminals, not shown) accommodated in the pair of terminal accommodating portions are connected to the contact portions (male terminals) 13 of the pair of terminals 10.

Further, a hood portion (not shown) of the counterpart connector 2 is fitted into the annular groove 44 of the connector 1. As a result, the hood portion is brought into close contact with the sealing member 71 (see FIG. 2), so that a fitted portion between the connector 1 and the counterpart connector 2 is sealed.

Further, a pair of bolts (not shown) inserted into hole portions 81 formed in a pair of Range portions 82 of the upper shield shell 80 (see FIG. 1) of the counterpart connector 2 are screwed into the bolt holes 51 formed in the pair of flange portions 52 of the upper shield shell 50 of the connector 1, respectively. As a result, the upper shield shell 50 of the connector 1 and the upper shield shell 80 of the counterpart connector 2 are fastened and electrically connected by a pair of bolts, and a good shielding effect can be obtained.

<Functions and Effects>

As described above, when the connector 1 is actually used in a state where the connector 1 and the counterpart connector 2 are fitted to each other, during energization of the terminal 10, the temperature of the terminal 10 and the housing 20 around the terminal 10 rises due to Joule heat caused by the energization. On the other hand, when the terminal 10 is not energized, such an increase in temperature does not occur. In other words, by repeatedly switching between the energization and the non-energization of the terminal 10, the temperature of the terminal 10 and the housing 20 repeatedly fluctuates up and down. Here, since the metal material constituting the terminal 10 and the resin material constituting the housing 20 have different linear thermal expansion coefficients, rates of expansion and contraction associated with the temperature fluctuation are also different. Due to such a difference in linear thermal expansion coefficient, when the above-described temperature fluctuation is repeated, damage such as a crack may occur in the housing 20 with a portion of the housing 20 adjacent to a sharp portion such as a corner portion or the like of the terminal 10 as a starting point. It is desirable to prevent such damage of the housing 20 (that is, to improve heat shock resistance).

In this regard, in the connector 1 according to the present embodiment, the housing 20 includes the first resin molded body 30 in which a part of the terminal 10 is embedded and the second resin molded body 40 in which a part of the first resin molded body 30 is embedded, and the linear thermal expansion coefficient of the material constituting the first resin molded body 30 is smaller than the linear thermal expansion coefficient of the material constituting the second resin molded body 40. Therefore, as compared with a case where the entire housing 20 is formed of the second resin molded body 40, the rate of thermal deformation of a portion (that is, the first resin molded body 30) that comes into direct contact with the terminal 10 can be reduced. Therefore, damage or the like of the housing 20 in the vicinity of the terminal 10 due to heat generation at the time of use of the connector 1 can be prevented. Further, in the connector 1, the first resin molded body 30 and the second resin molded body 40 are made of a composition containing a combination of the same substances (polyethylene terephthalate resin and glass fiber), and the content rate of the glass fiber in the composition constituting the first resin molded body 30 is made larger than the content rate of the glass fiber in the composition constituting the second resin molded body 40, so that the linear thermal expansion coefficient of the material constituting the first resin molded body 30 is made smaller than the linear thermal expansion coefficient of the material constituting the second resin molded body 40. In general, the glass fiber is more expensive than the polyethylene terephthalate resin. Therefore, as compared with a case where the entire housing 20 is formed of the first resin molded body 30, it is possible to reduce the amount of use of the expensive material having a smaller linear thermal expansion coefficient (glass fiber in the present embodiment), so that an increase in the manufacturing cost of the connector 1 can be reduced. Therefore, the connector 1 according to the present embodiment can improve the heat shock resistance while reducing an increase in the manufacturing cost.

Further, when the resin composition constituting the first resin molded body 30 further contains an elastomer, the elastomer is contained in the resin composition, so that a value of the fracture strain of the first resin molded body 30 becomes large, and the resin composition can withstand a larger stress. Therefore, the heat shock resistance of the connector 1 can be further improved.

Other Embodiments

The present disclosure is not limited to the above embodiment, and various modifications can be adopted within the scope of the present disclosure. For example, the present disclosure is not limited to the above-described embodiment, and modifications, improvements, and the like can be made as appropriate. In addition, materials, shapes, dimensions, numbers, arrangement positions or the like of elements in the embodiments described above are optional and are not limited as long as the present disclosure can be achieved.

In the above-described embodiment, the first resin molded body 30 and the second resin molded body 40 are made of a composition containing a combination of the same substances (polyethylene terephthalate resin and glass fiber), and the content rate of the glass fiber in the composition constituting the first resin molded body 30 is made larger than the content rate of the glass fiber in the composition constituting the second resin molded body 40, so that the linear thermal expansion coefficient of the material constituting the first resin molded body 30 is made smaller than the linear thermal expansion coefficient of the material constituting the second resin molded body 40. On the other hand, the first resin molded body 30 and the second resin molded body 40 may be made of compositions containing a combination of different substances, so that the linear thermal expansion coefficient of the material constituting the first resin molded body 30 is made smaller than the linear thermal expansion coefficient of the material constituting the second resin molded body 40.

In the above embodiment, the content rate of the glass fiber in the composition constituting the first resin molded body 30 is 30% by weight, and the content rate of the glass fiber in the composition constituting the second resin molded body 40 is 15% by mass. However, when the magnitude relation of the linear thermal expansion coefficient is achieved by a content rate of the glass fiber, the content ratio of the glass fiber in the composition constituting the first resin molded body 30 may be larger than a content rate of the glass fiber in the composition constituting the second resin molded body 40, and the content rates of both glass fibers are not necessarily limited to the specific value described above.

Here, features of the embodiment of the connector 1 and the manufacturing method of the connector 1 according to the present disclosure described above will be briefly summarized and listed in the following first to fifth aspects.

According to a first aspect of the present disclosure, a connector (1) includes: a terminal fitting (10); and a housing (20) holding the terminal fitting (10). The housing (20) includes a first resin molded body (30) in which at least a part of the terminal fitting (10) is embedded, the first resin molded body (30) being made of a first material, and a second resin molded body (40) in which at least a part of the first resin molded body (30) is embedded, the second resin molded body (40) being made of a second material. The first material has a linear thermal expansion coefficient smaller than that of the second material.

According to the connector having the configuration of the first aspect, the linear thermal expansion coefficient of the material constituting the first resin molded body in which the terminal fitting is embedded is smaller than the linear thermal expansion coefficient of the material constituting the second resin molded body in which the first resin molded body is embedded. Therefore, as compared with a case where the entire housing is formed of the second resin molded body, a rate of thermal deformation of a portion (that is, the first resin molded body) that comes into direct contact with the terminal fitting can be reduced. Therefore, it is possible to prevent the occurrence of damage or the like in a housing portion around the terminal fitting due to temperature fluctuation when the terminal fitting is energized or not energized. Further, as compared with a case where the entire housing is formed of the first resin molded body, it is possible to reduce an amount of use of the expensive material having a relatively small linear thermal expansion coefficient, so that an increase in the manufacturing cost of the connector can be reduced. Therefore, the connector of the present configuration can improve heat shock resistance while reducing an increase in the manufacturing cost.

According to a second aspect of the present disclosure, the connector (1) is connectable to a counterpart connector (2) including a counterpart terminal. The terminal fitting (10) includes a contact portion (13) shaped in a form of a hollow tube having a first open end and a second open end, the contact portion (13) being configured to contact the counterpart terminal when the connector (i) is connected to the counterpart connector (2). The first resin molded body (30) includes: a shaft-shaped portion (31) disposed inside the hollow tube of the contact portion (13), the shaft-shaped portion (31) having a first end and a second end, the second end being closer to the second open end of the contact portion (13) than the first end; a first end portion (32) connected to the first end of the shaft-shaped portion (31) and covering the first open end of the contact portion (13); and a second end portion (33) connected to the second end of the shaft-shaped portion (31) and covering the second open end of the contact portion (13).

According to the connector having the configuration of the second aspect, the first resin molded body is integrally molded so as to be disposed in the hollow of the tubular contact portion of the terminal fitting and both of the pair of opening portions of the contact portion. As a result, the first resin molded body is disposed around the contact portion where a particularly large temperature fluctuation may occur due to the contact resistance with the counterpart terminal in addition to the electrical resistance of the terminal fitting itself when the terminal fitting is energized. Therefore, the heat shock resistance of the connector can be further improved.

According to a third aspect of the present disclosure, the first material includes a first composition and the second material includes a second composition, each of the first composition and the second composition containing a polyethylene terephthalate resin and a glass fiber. The first composition has a content rate of the glass fiber larger than that of the second composition.

According to the connector having the configuration of the third aspect, the first resin molded body and the second resin molded body are formed using the resin composition containing the polyethylene terephthalate resin and the glass fiber. Further, the content rate of the glass fiber in the resin composition of the first resin molded body is larger than the content rate of the glass fiber in the resin composition of the second resin molded body. By such a difference in composition, the magnitude relationship of the linear thermal expansion coefficient described above can be achieved.

According to a fourth aspect of the present disclosure, the first composition further contains an elastomer.

According to the connector having the configuration of the fourth aspect, the resin composition constituting the first resin molded body further contains an elastomer. When the elastomer is contained in the resin composition, a value of the fracture strain of the first resin molded body becomes large, and the resin composition can withstand a larger stress. Therefore, the heat shock resistance of the connector can be further improved.

According to a fifth aspect of the present disclosure, a manufacturing method of a connector (1) in which a terminal fitting (10) is held by a housing (20), the manufacturing method include: molding a first resin molded body (30), being made of a first material, in which at least a part of the terminal fitting (10) is embedded such that the first resin molded body (30) has a shape of a part of the housing (20); and molding a second resin molded body (40), being made of a second material, in which at least a part of the first resin molded body (30) is embedded such that the second resin molded body (40) has a shape of another part of the housing (20). The first material has a linear thermal expansion coefficient smaller than that of the second material.

According to the manufacturing method of the connector having the configuration of the fifth aspect, after the first resin molded body is molded (primary molded) such that the terminal fitting is embedded, the second resin molded body is molded (secondary molded) such that the first resin molded body is embedded. Further, the linear thermal expansion coefficient of the material constituting the first resin molded body is smaller than the linear thermal expansion coefficient of the material constituting the second resin molded body in which the first resin molded body is embedded. Therefore, as compared with a case where the entire housing is formed of the second resin molded body, a rate of thermal deformation of a portion (that is, the first resin molded body) that comes into direct contact with the terminal fitting can be reduced. Therefore, it is possible to prevent the occurrence of damage or the like in a housing portion around the terminal fitting due to temperature fluctuation when the terminal fitting is energized or not energized. Further, as compared with a case where the entire housing is formed of the first resin molded body, it is possible to reduce an amount of use of the expensive material having a relatively small linear thermal expansion coefficient, so that an increase in the manufacturing cost of the connector can be reduced. Therefore, the connector manufactured by the manufacturing method of the present configuration can improve heat shock resistance while reducing an increase in the manufacturing cost.

What is claimed is:

1. A connector comprising:
a terminal fitting; and
a housing holding the terminal fitting,
wherein the housing comprises:
a first resin molded body in which at least a part of the terminal fitting is embedded, the first resin molded body being made of a first material; and
a second resin molded body in which at least a part of the first resin molded body is embedded, the second resin molded body being made of a second material,
wherein the first material has a linear thermal expansion coefficient smaller than that of the second material,
wherein the connector is connectable to a counterpart connector comprising a counterpart terminal,
wherein the terminal fitting includes a contact portion shaped in a form of a hollow tube having a first open end and a second open end, the contact portion being configured to contact the counterpart terminal when the connector is connected to the counterpart connector, and
wherein the first resin molded body includes:
a shaft-shaped portion disposed inside the hollow tube of the contact portion, the shaft-shaped portion having a first end and a second end, the second end being closer to the second open end of the contact portion than the first end;
a first end portion connected to the first end of the shaft-shaped portion and covering the first open end of the contact portion; and a second end portion connected to the second end of the shaft-shaped portion and covering the second open end of the contact portion.

2. The connector according to claim 1, wherein the first material comprises a first composition and the second material comprises a second composition, each of the first composition and the second composition containing a polyethylene terephthalate resin and a glass fiber, and wherein the first composition has a content rate of the glass fiber larger than that of the second composition.

3. The connector according to claim 2, wherein the first composition further contains an elastomer.

4. A manufacturing method of a connector in which a terminal fitting is held by a housing, the manufacturing method comprising:

molding a first resin molded body, being made of a first material, in which at least a part of the terminal fitting is embedded such that the first resin molded body has a shape of a part of the housing; and molding a second resin molded body, being made of a second material, in which at least a part of the first resin molded body is embedded such that the second resin molded body has a shape of another part of the housing, wherein the first material has a linear thermal expansion coefficient smaller than that of the second material, wherein the connector is connectable to a counterpart connector comprising a counterpart terminal, wherein the terminal fitting includes a contact portion shaped in a form of a hollow tube having a first open end and a second open end, the contact portion being configured to contact the counterpart terminal when the connector is connected to the counterpart connector, and wherein the first resin molded body includes:

a shaft-shaped portion disposed inside the hollow tube of the contact portion, the shaft-shaped portion having a first end and a second end, the second end being closer to the second open end of the contact portion than the first end;

a first end portion connected to the first end of the shaft-shaped portion and covering the first open end of the contact portion; and a second end portion connected to the second end of the shaft-shaped portion and covering the second open end of the contact portion.

* * * * *